US010331305B2

(12) United States Patent
Lim et al.

(10) Patent No.: US 10,331,305 B2
(45) Date of Patent: Jun. 25, 2019

(54) AGGREGATING AND PRESENTING EVENT INFORMATION

(71) Applicant: Microsoft Technology Licensing, LLC, Redmond, WA (US)

(72) Inventors: Melissa N. Lim, Seattle, WA (US); Tyler N. Jensen, Seattle, WA (US); Shawn Callegari, Redmond, WA (US); Jared J. Frew, Seattle, WA (US); Terri L. Chudzik, Seattle, WA (US); Ashish Gupta, Seattle, WA (US); Renle Xia, Redmond, WA (US); Alice Jane Brush, Bellevue, WA (US); Joseph A. Schrader, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 107 days.

(21) Appl. No.: 14/078,461

(22) Filed: Nov. 12, 2013

(65) Prior Publication Data

US 2015/0135088 A1    May 14, 2015

(51) Int. Cl.
*G06F 3/048*    (2013.01)
*G06F 3/0484*   (2013.01)
(Continued)

(52) U.S. Cl.
CPC ......... *G06F 3/0484* (2013.01); *G06Q 10/109* (2013.01); *G06Q 10/1093* (2013.01);
(Continued)

(58) Field of Classification Search
None
See application file for complete search history.

(56) References Cited

U.S. PATENT DOCUMENTS 7,035,896 B1   4/2006   Schneider
8,296,686 B1   10/2012  Tedesco et al.
(Continued)

FOREIGN PATENT DOCUMENTS

CN    102693261 A    9/2012
JP    2006025056 A   1/2006
(Continued)

OTHER PUBLICATIONS

"Countdown", Retrieved at <<http://www.windowsphone.com/en-us/store/app/countdown/fc0eba77-0904-4bb8-a4bf-80dc32e388d0>>, Apr. 20, 2013, 3 pages.
(Continued)

*Primary Examiner* — William C Trapanese (57) ABSTRACT

Embodiments of the disclosure aggregate and present event information relating to a calendar event associated with an application executing on a computing device. In some embodiments, data relating to the calendar event is obtained from a content source that is outside an execution context of the application. The data relating to the calendar event is obtained and/or presented intermittently in a user interface element associated with the application. The content source that is outside the execution context of the application may be within an execution context of one or more other applications, an operating system of the computing device, and/or a web service.

20 Claims, 7 Drawing Sheets

(51) Int. Cl.
*H04M 1/725* (2006.01)
*H04L 29/08* (2006.01)
*H04W 4/21* (2018.01)
*H04W 4/02* (2018.01)
*G06Q 10/10* (2012.01)

(52) U.S. Cl.
CPC ........ *H04L 67/18* (2013.01); *H04M 1/72566* (2013.01); *H04W 4/02* (2013.01); *H04W 4/21* (2018.02)

(56) References Cited

U.S. PATENT DOCUMENTS

| | | | |
|---|---|---|---|
| 8,423,288 B2 | 4/2013 | Stahl | |
| 2006/0217990 A1 | 9/2006 | Theimer | |
| 2008/0034047 A1* | 2/2008 | Rosenberg | G06Q 10/109 709/206 |
| 2008/0175103 A1* | 7/2008 | Nakamura | G06F 17/30265 368/10 |
| 2008/0243841 A1 | 10/2008 | Bonnet et al. | |
| 2009/0070708 A1* | 3/2009 | Finkelstein | G06F 9/4443 715/789 |
| 2009/0192702 A1 | 7/2009 | Bourne | |
| 2010/0082239 A1* | 4/2010 | Hardy | G01C 21/26 701/532 |
| 2010/0094529 A1 | 4/2010 | Gupta et al. | |
| 2011/0211813 A1 | 9/2011 | Marks | |
| 2011/0225015 A1 | 9/2011 | Spivack et al. | |
| 2011/0231280 A1 | 9/2011 | Farah | |
| 2011/0239146 A1 | 9/2011 | Dutta et al. | |
| 2011/0239158 A1 | 9/2011 | Barraclough et al. | |
| 2012/0209839 A1 | 8/2012 | Andrews et al. | |
| 2013/0054792 A1 | 2/2013 | Sharaf | |
| 2013/0217416 A1 | 8/2013 | Matthews et al. | |
| 2013/0268282 A1 | 10/2013 | Hugo et al. | |
| 2014/0040716 A1* | 2/2014 | Lin | G06F 17/2235 715/205 |
| 2014/0136612 A1* | 5/2014 | Redfern | G06Q 50/01 709/204 |

FOREIGN PATENT DOCUMENTS

| | | |
|---|---|---|
| JP | 2011519437 A | 7/2011 |
| RU | 2403614 C2 | 11/2010 |
| WO | 2008021734 A1 | 2/2008 |
| WO | 2013096942 A1 | 6/2013 |

OTHER PUBLICATIONS

Sterling, John, "15 iPhone Apps to Count Down the Holidays", Retrieved at <<http://iphone.appstorm.net/roundups/lifestyle-roundups/15-iphone-apps-to-count-down-the-holidays/>>, Oct. 5, 2010, 20 pages.
"The Countdown Timer Pro iPhone App", Retrieved at <<http://www.timeanddate.com/iphone/countdown.html#appfeatures>>, Jan. 14, 2012, 2 pages.
Jackson, Amy, "Get TripIt Pro and Sync Your Calendar On-the-Go", Retrieved at <<http://www.tripit.com/blog/2012/02/get-tripit-pro-and-sync-your-calendar-on-the-go.html>>, Feb. 15, 2012, 2 pages.
"Google Now", Retrieved at <<www.en.wikipedia.org/wiki/Google_Now>>, Retrieved Date: Aug. 26, 2013, Wikipedia, 4 pages.
Clarke, Gareth, "Countdown+", Retrieved at <<https://itunes.apple.com/us/app/countdown+/id447313743?mt=8>>, Retrieved Date: Aug. 26, 2013, 3 pages.
Sosa, Omar, "22 Days HD ~ countdown with style", Retrieved at <<https://itunes.apple.com/us/app/22-days-hd-countdown-style/id441701847?mt=8>>, Retrieved Date: Aug. 26, 2013, 3 pages.
"International Search Report and Written Opinion Issued in PCT Patent Application No. PCT/US2014/064715", dated Apr. 28, 2015, 6 Pages.
"Supplementary Search Report Issued in European Patent Application No. 14812021.5", dated Jul. 22, 2016, 4 Pages.
"Office Action Issued in European Patent Application No. 14812021.5", dated Aug. 30, 2016, 5 Pages.
"First Office Action and Search Report Issued in Chinese Patent Application No. 201480061476.4", dated Jun. 5, 2018, 13 Pages.
"Office Action Issued in Russian Patent Application No. 2016118227", dated Jul. 17, 2018, 6 Pages. (w/o English Translation).
"Office Action Issued in Japanese Patent Application No. 2016-526356", dated Aug. 2, 2018, 7 Pages.
"Office Action issued in Mexican patent application No. MX/a/2016/006107", dated Sep. 3, 2018, 7 Pages.
"Office Action Issued in Mexican Patent Application No. MX/a/2016/006107", dated Jan. 9, 2018, 8 Pages.
"Office Action Issued in European Patent Application No. 14812021.5", dated Jan. 17, 2019, 6 Pages.

\* cited by examiner

AGGREGATING AND PRESENTING EVENT INFORMATION

BACKGROUND

Existing calendar applications receive data from a user, associate the received data with a particular calendar event, and store the received data in memory accessible to the calendar applications. While some calendar events may further be classified or categorized by the user (e.g., personal, work, high priority, low priority, etc.), the calendar applications generally treat all the calendar events the same by simply receiving and storing the data from the user.

Some existing third-party applications obtain data related to the calendar events from the Internet and present the data to the user on demand. For example, a third-party application obtains weather information related to a calendar event associated with upcoming travel. However, these third-party applications are limited in their ability to identify and access data relating to an event from content sources outside an execution context of the third party applications.

SUMMARY

Embodiments of the disclosure enable a computing device to select a calendar event associated with an application executing on the computing device. Data relating to the selected calendar event is obtained from a memory area outside an execution context of the application. The obtained data is presented in a user interface (UI) element, associated with the application, for display to a user. The data is obtained and presented intermittently in the UI element.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure enable aggregating and presenting calendar event information to a user 102 of a computing device 104. A calendar event 114 is selected by an application, such as application 110A, executing on the computing device 104. Data relating to the calendar event 114 is received from one or more memory area portions 112B outside an execution context of the application 110A. In some embodiments, the related data about the calendar event 114 associated with the application 110A is received from the memory area portion 112B within the computing device 104 but outside the execution context of the application 110A. For example, another application 110B executing on the computing device 104 or an operating system of the computing device 104 may have access to the data relating to the calendar event 114 that is stored in the memory area portion 112B. In some embodiments, the operating system monitors the calendar event 114 associated with the application 110A and provides the data from a plurality of the memory area portions 112B to a user interface (UI) element 116 associated with the application 110A. Monitoring of the calendar events 114 and providing related data may be performed periodically and/or intermittently.

Aspects of the disclosure further enable the application 110A associated with the calendar event 114 to obtain data relating to the calendar event 114 from the one or more memory area portions 112B, which are outside the execution context of the application 110A. Further, aspects of the disclosure enable the user 102 of the computing device 104 to indicate one or more particular calendar events 114 (e.g., events of importance or other interest) for quick access of the data relating to those calendar events 114 on the computing device 104. Thus, obtaining and presenting data relating to the calendar event 114 creates a more engaging and personal user experience for the user 102 of the computing device 104, such as illustrated in FIG. 4 through FIG. 7.

Figure 1:
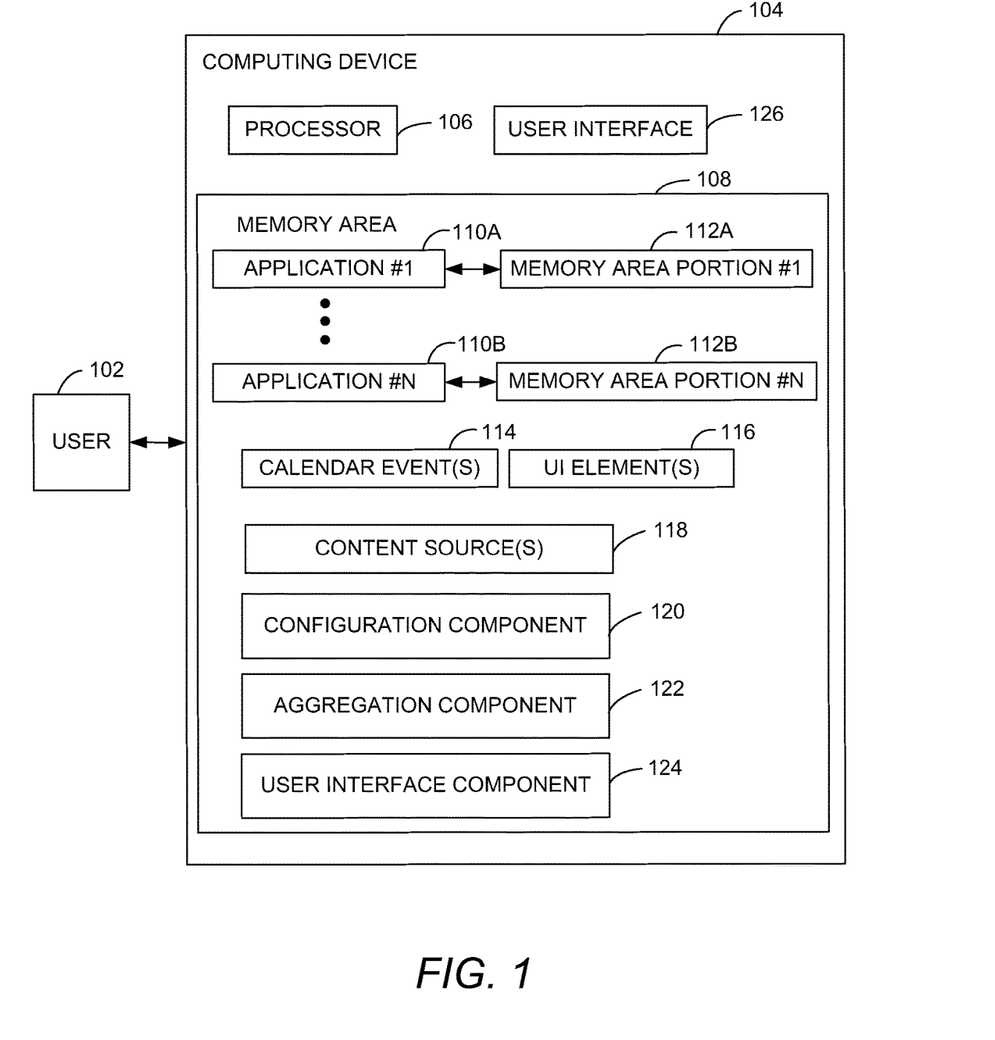
FIG. 1 is an exemplary block diagram illustrating a computing device for collecting and presenting calendar event information to a user of a computing device.

Referring again to FIG. 1, an exemplary block diagram illustrates collecting and presenting calendar event information to the user 102 of the computing device 104. In the example of FIG. 1, the computing device 104 associated with the user 102 represents a system for presenting data relating to the calendar event 114 associated with the application 110A in the UI element 116 associated with the application 110A. The data relating to the calendar event 114 is obtained from the memory area portion 112B outside the execution context of the application 110A, and/or from the memory area portion 112A within the execution context of the application 110A. The computing device 104 represents any device executing instructions (e.g., as application programs, operating system functionality, or both) to implement the operations and functionality associated with the computing device 104. The computing device 104 may include a mobile computing device or any other portable device. In some embodiments, the mobile computing device includes a mobile telephone, laptop, tablet, computing pad, netbook, gaming device, wearable computing device (such as in watch or glasses form factors), and/or portable media player. The computing device 104 may also include less portable devices such as desktop personal computers, kiosks, tabletop devices, industrial control devices, wireless charging stations, and electric automobile charging stations. Additionally, the computing device 104 may represent a group of processing units or other computing devices.

In some embodiments, the computing device 104 has at least one processor 106, a memory area 108, and at least one user interface 126. The processor 106 includes any quantity of processing units, and is programmed to execute computer-executable instructions for implementing aspects of the disclosure. The instructions may be performed by the processor 106 or by multiple processors executing within the computing device 104, or performed by a processor external to the computing device 104. In some embodiments, the processor 106 is programmed to execute instructions such as those illustrated in the figures (e.g., FIG. 2).

In some embodiments, the processor 106 represents an implementation of analog techniques to perform the operations described herein. For example, the operations may be performed by an analog computing device and/or a digital computing device.

The computing device 104 further has one or more computer readable media such as the memory area 108. The memory area 108 includes any quantity of media associated with or accessible by the computing device 104. The memory area 108 may be internal to the computing device 104 (as shown in FIG. 1), external to the computing device 104 (not shown), or both (not shown). In some embodiments, the memory area 108 includes read-only memory, read-write memory, and/or memory wired into an analog or digital computing device 104.

The memory area 108 stores, among other data, one or more applications, such as application #1 (110A) through application #N (110B). The applications, when executed by the processor 106, operate to perform functionality on the computing device 104. Exemplary applications include mail application programs, web browsers, calendar application programs, address book application programs, messaging programs, media applications, location-based services, search programs, and the like. The applications may communicate with counterpart applications or services such as web services accessible via a network. For example, the applications may represent downloaded client-side applications that correspond to server-side services executing in a cloud.

The application #1 (110A) through application #N (110B) have their respective execution contexts associated therewith. For example, application #1's execution context is memory area portion #1 (112A) and application #N's execution context is memory area portion #N (112B), as illustrated in FIG. 1. In some embodiments, the memory area portion #1 (112A) associated with application #1 (110A) and the memory area portion #2 (112B) are within the computing device 104 (see FIG. 1), and represent working memory and/or persistent memory. In such embodiments, data relating to the calendar event 114 is obtained by the application 110A from the memory area portion 112B (outside the execution context of application 110A) within the computing device 104. In an exemplary embodiment, some or all the memory area portion #1 (112A) and/or memory area portion #2 (112B) may be outside the computing device 104 (not shown).

As an example, the processor 106 is programmed to select, by the application 110A, the calendar event 114 associated with the application 110A. The application 110A has a first portion of memory (e.g., memory area portion 112A) associated therewith for data storage. Data relating to the selected calendar event 114 is received from a second portion of the memory (e.g., memory area portion 112B) outside the execution context of the application 110A. The exemplary second portion of the memory may be associated with another application 110B executing on the computing device 104. The received data is presented in one of more of the UI elements 116 associated with the application 110A. The processor 106 receives the data and presents the received data to the user 102 of the computing device 104 intermittently.

In some embodiments, the processor 106 continues to receive the data relating to the calendar event 114 and to present the received data intermittently for a defined period of time after occurrence of the calendar event 114 (e.g., up to 10 days after the calendar event 114 is over). In order to save battery life, the processor 106 may receive the data relating to the calendar event 114 based on user activity detected on the computing device 104. For example, data relating to the calendar event 114 is not received and presented to the user 102 if the user 102 has not interacted with the computing device 104 for a predefined time period, or if the user 102 is working in another application, such as application 110B. As another example, data relating to the calendar event 114 is received and presented to the user 102 only when the user 102 is interacting with the application 110A having the calendar event 114 associated therewith.

The processor 106 is further programmed to personalize the computing device 104 based on the received data. The computing device 104 may be personalized by performing, for example: adding a reminder for the calendar event 114, setting a wakeup alarm on a day of the calendar event 114, setting a ringtone of the computing device 104, creating a photo album to store photographs associated with the calendar event 114, configuring a vacation reply email setting, creating a to-do list for the calendar event 114, setting a background image for the computing device 104, and/or setting a lock screen image for the computing device 104. The personalization of the computing device 104 may be performed before and/or after occurrence of the calendar event 114.

The memory area 108 further stores the UI elements 116 associated with the applications (applications 110A through 110B), one or more content sources 118, and the calendar events 114. An example of UI element 116 associated with the application 110A may be an active tile or other UI element capable of displaying multiple screens of data in succession (e.g., flipping to another screen every three seconds).

Aspects of the disclosure enable obtaining data relating to the calendar event 114 from the content sources 118, some of which are outside the execution context of the application 110A associated with the calendar event 114. For example, some of the content sources 118 may be from the memory area portion #1 (112A) (e.g., within the execution context of the application associated with the calendar event 114) while some other content sources 118 may be from the memory area portion #2 (112B) (e.g., outside the execution context of the application associated with the calendar event 114). Exemplary content sources 118 that are outside the context of the application associated with the calendar event 114 include web sites accessible via the Internet. Further, the content sources 118 may be delivered as part of a service, or across device boundaries. For example, one of the UI elements 116 relating to a vacation may be enhanced by local weather from a weather service. As another example, one of the UI elements 116 relating to an awards event displays data about a pre-awards show (e.g., obtained from a television of the user 102).

The memory area 108 further stores one or more computer-executable components. Exemplary components include a configuration component 120, an aggregation component 122, and a user interface component 124. The configuration component 120, when executed by at least one processor (e.g., processor 106) of the computing device 104, causes the processor to select the calendar event 114 associated with the application 110A. In some embodiments, the calendar event 114 has a start date associated therewith.

The aggregation component 122, when executed by at least one processor (e.g., processor 106) of the computing device 104, causes the processor to obtain, from the content source 118 outside the execution context of the application 110A, data relating to the calendar event 114 selected by the configuration component 120. The user interface component 124, when executed by at least one processor (e.g., processor 106) of the computing device 104, causes the processor to present the data obtained by the aggregation component 122 in the UI element 116 for display to the user 102 of the computing device 104. The UI element 116 is associated with the application 110A. The aggregation component 122 and the user interface component 124 execute intermittently before and after the start date associated with the calendar event 114.

The UI element 116 causes the processor (e.g., processor 106) associated with the computing device 104 to receive, via the UI element 116, a selection of the data obtained by the aggregation component 122. Responsive to the received data selection, aggregation metadata describing aggregation of the selected data is provided to the user 102. Exemplary aggregation metadata includes at least one of a time of aggregation, a network associated with the content source, or an attribution of the selected data.

In an exemplary embodiment, the aggregation component 122 and the user interface component 124 execute to display, after occurrence of the calendar event 114, photographs and/or other media captured during the calendar event 114. The photographs may be obtained by the application 110A, with which the calendar event 114 is associated, from a photo album created during personalization of the computing device 104. The application 110B (e.g., a camera application) on the computing device 104 stores the photographs taken during the calendar event 114 in the created photo album during personalization of the computing device 104. In another example, the aggregation component 122 and the user interface component 124 execute to obtain and display social network messages relating to the calendar event 114. In these examples, the photographs in the photo album and the social network messages are stored in the memory area portion 112B outside the execution context of the application 110A with which the calendar event 114 is associated, while the application 110A maintains a link or reference (e.g., a uniform resource identifier) to the data stored in the memory area portions 112B.

Figure 2:
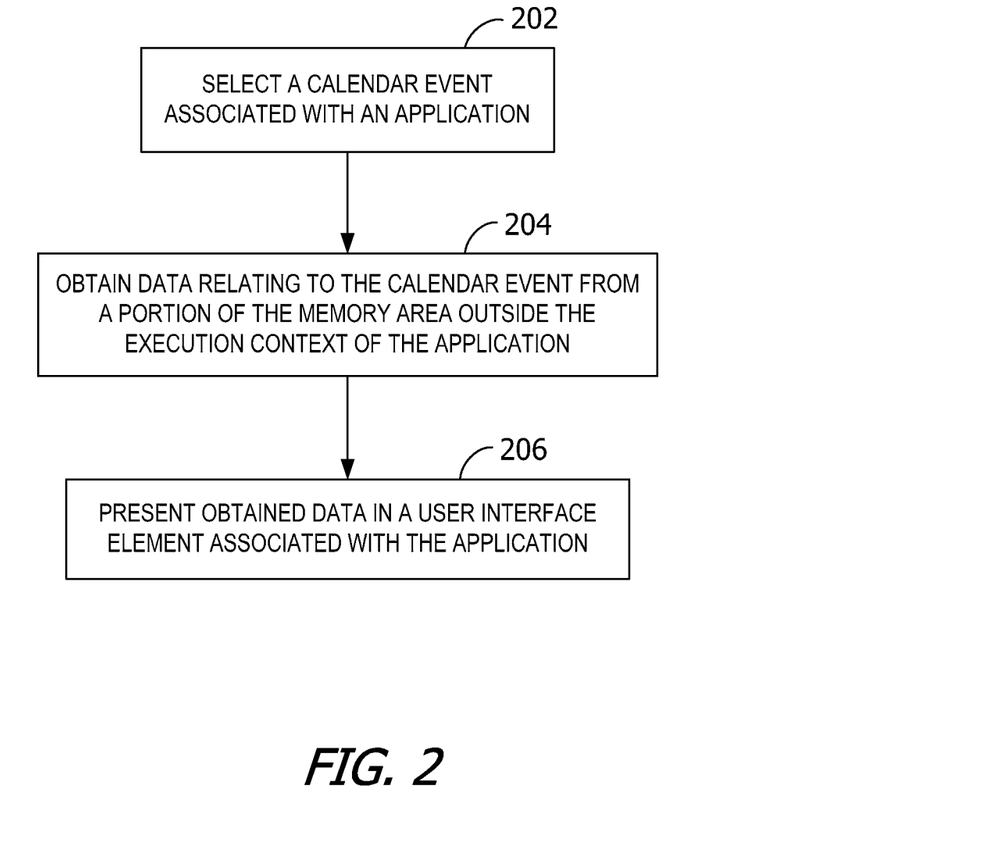
FIG. 2 is an exemplary flow chart illustrating operation of a computing device to select, obtain, and present data relating to a calendar event to a user.

Referring next to FIG. 2, an exemplary flow chart illustrates operation of the computing device 104 to select, obtain, and present data relating to the calendar event 114 to a user 102. At 202, the calendar event 114 associated with the application 110A executing on the computing device 104 is selected. Selecting the calendar event 114 includes, for example, automatically selecting the calendar event 114 based on a start date (and/or a start time) associated with the calendar event 114, and/or receiving a selection of the calendar event 114 from the user 102. At 204, data relating to the selected calendar event 114 is obtained from at least one memory area outside the execution context of the application 110A. For example, related data to the calendar event 114 is obtained by performing a device-wide text-based search for the data. In another example, related data to the calendar event 114 is obtained by performing an Internet search. In embodiments, when the calendar event 114 has a location associated therewith, the data may be obtained by performing a search for the data using the location as a search term. If the calendar event 114 has a start time associated therewith, the data is obtained by performing a search for the data based on the start time of the calendar event 114. Those skilled in the art will note that the data relating to the calendar event 114 may be obtained based on any characteristic or property of the calendar event 114 (e.g., end date, end time, duration, etc.).

The obtained data is presented at 206 in the UI element 116 for display to the user 102 of the computing device 104. In some embodiments, the UI element 116 is associated with the application 110A with which the calendar event 114 is associated. For example, the applications 110A maintains control of the behavior of the UI element 116. The operations 204 and 206 are performed intermittently (e.g., at a regular time interval, at a user-defined interval, etc.).

In an exemplary embodiment, data relating to the calendar event 114 associated with the application 110A is obtained from both a memory area (e.g., memory area portion 112B as shown in FIG. 1) on the computing device 104 and from a memory area (not shown) off the computing device 104. In such embodiments, some of the data relating to the calendar event 114 is located on the computing device 104 while some data is located off the computing device 104. The obtained data includes, for example, text data, image data, video data, and/or audio data. In some embodiments, additional data from the user 102 of the computing device 104 is received over time by the application 110A and the additional data is stored within the execution context of the application 110A.

Further, URIs, or other links or references, are generated or otherwise received for the data obtained in operation 204. The generated URIs are stored within the execution context of the application 110A with which the calendar event 114 is associated. As an example, the stored, generated URIs may be shared with at least one attendee associated with the calendar event 114. As such, all attendees associated with the calendar event 114 are presented with a consistent view (in their respective computing devices) of data relating to the calendar event 114. In some embodiments, to reduce network data consumption, the stored generated URIs are shared upon creation only with attendees who are available online or are not busy.

In this manner, rather than storing copies of the data relating to the calendar event 114, aspects of the disclosure operate to store the URIs that are then referenced to obtain the related data when presenting the data to the user 102.

The data obtained in operation 204 (e.g., the URIs pointing to the related data) is stored in a data structure associated with the UI element 116. The stored data structure is transmitted to another computing device, which updates the data structure with additional data relating to the calendar event 114. The additional data may include a copy of the data itself, or a URI to the data. The updated data structure (e.g., updated with the additional data) is received by the computing device 104 from the other computing device. The UI element 116 is updated with the received updated data structure.

In this manner, the UI element 116 is synchronized across multiple devices of the same user 102, or with devices of a group of the users 102. As such, the user 102 is provided a consistent user experience across all the user computing devices. Further, data relating to the calendar event 114 and stored in other computing devices of the user 102 is also obtained and presented to the user 102 of the computing device 104. For example, the calendar event 114 on a first computing device receives captured photographs, video, and/or audio relating to the calendar event 114 and stored in a second computing device. In another example, the second computing device may have a third party application that is able to generate (or access) additional content that the first computing device cannot generate (or access).

In some embodiments, a communications interface component (not shown) is a part of the memory area 108. The communications interface component includes a network interface card and/or computer-executable instructions (e.g., a driver) for operating the network interface card. Communication between the computing device 104 and other devices may occur using any protocol or mechanism over any wired or wireless connection. In some embodiments, the communications interface is operable with short range communication technologies such as by using near-field communication (NFC) tags.

The user interface component 124 includes a graphics card for displaying data to the user 102 and receiving data from the user 102. The user interface component 124 may also include computer-executable instructions (e.g., a driver) for operating the graphics card. Further, the user interface component 124 may include a display (e.g., a touch screen display or natural user interface) and/or computer-executable instructions (e.g., a driver) for operating the display. The user interface component 124 may also include, for example, the following to provide data to the user 102 or receive data from the user 102: speakers, a sound card, a camera, a microphone, a vibration motor, one or more accelerometers, a BLUETOOTH brand communication module, global positioning system (GPS) hardware, and/or a photoreceptive light sensor. For example, the user 102 may input commands or manipulate data by moving the computing device 104 in a particular way.

Figure 3:
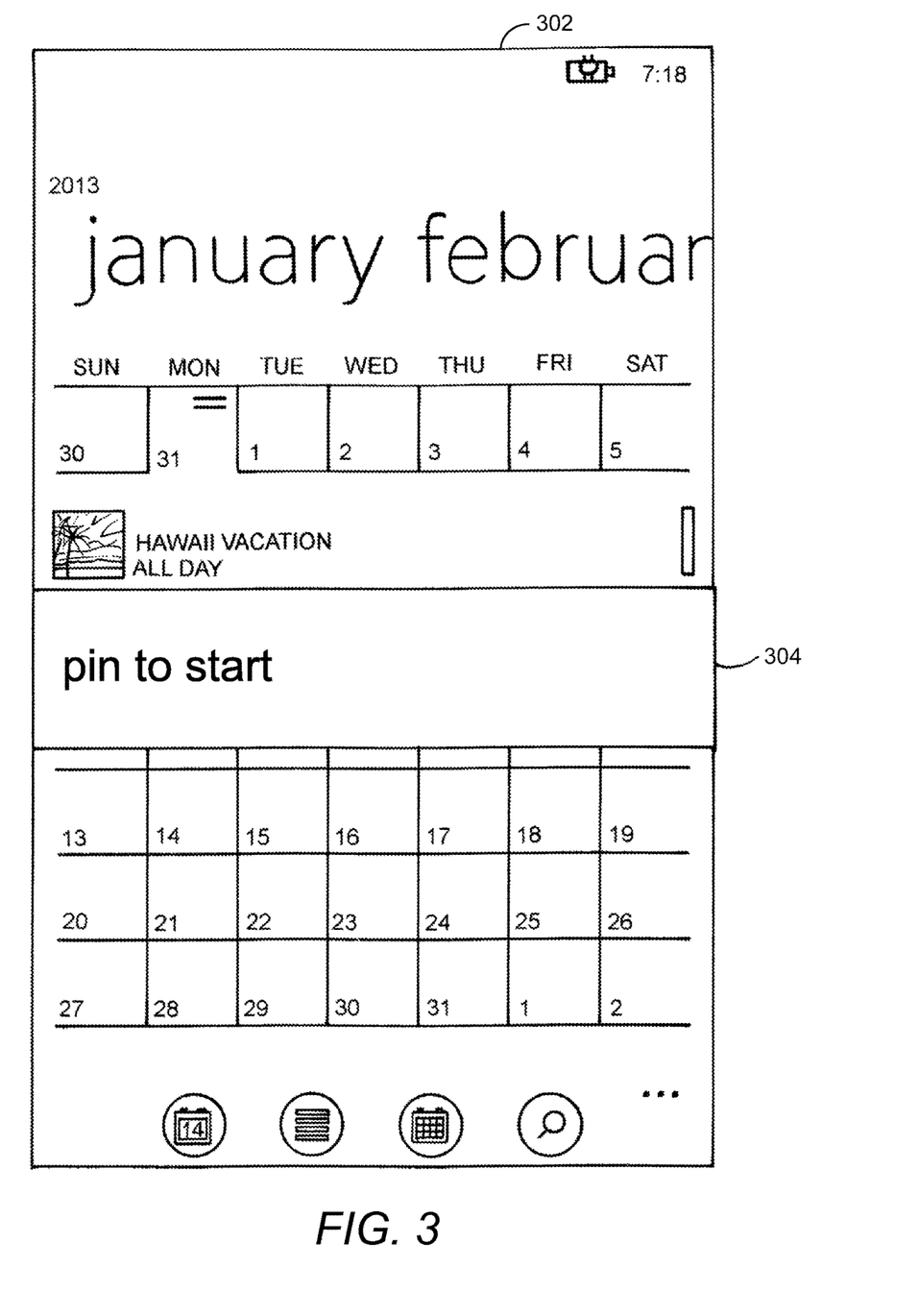
FIG. 3 is an exemplary user interface illustrating selection of a calendar event in a calendar application.

Referring next to FIG. 3, an exemplary user interface illustrates selection of the calendar event 114 in a calendar application. At 302, the calendar application is executed and at 304, the user 102 may direct the computing device 104 to display the calendar event 114 in a particular portion of the user interface 126 (e.g., a start screen, a lock screen, etc.), at a particular time (e.g., upon bootup, upon unlock of the computing device 104, etc.), and the like. For example, the user 102 pins the calendar event 114 (e.g., an appointment may be pinned by pressing and holding the calendar event 114 displayed on a touch screen display) to a start screen of the computing device 104 for quick access and visibility. The pinned events 114 are considered important to the user 102 and related content for the pinned events 114 is obtained from content sources 118, which are outside the execution context of the calendar application with which the pinned events 114 are associated.

Figure 4:
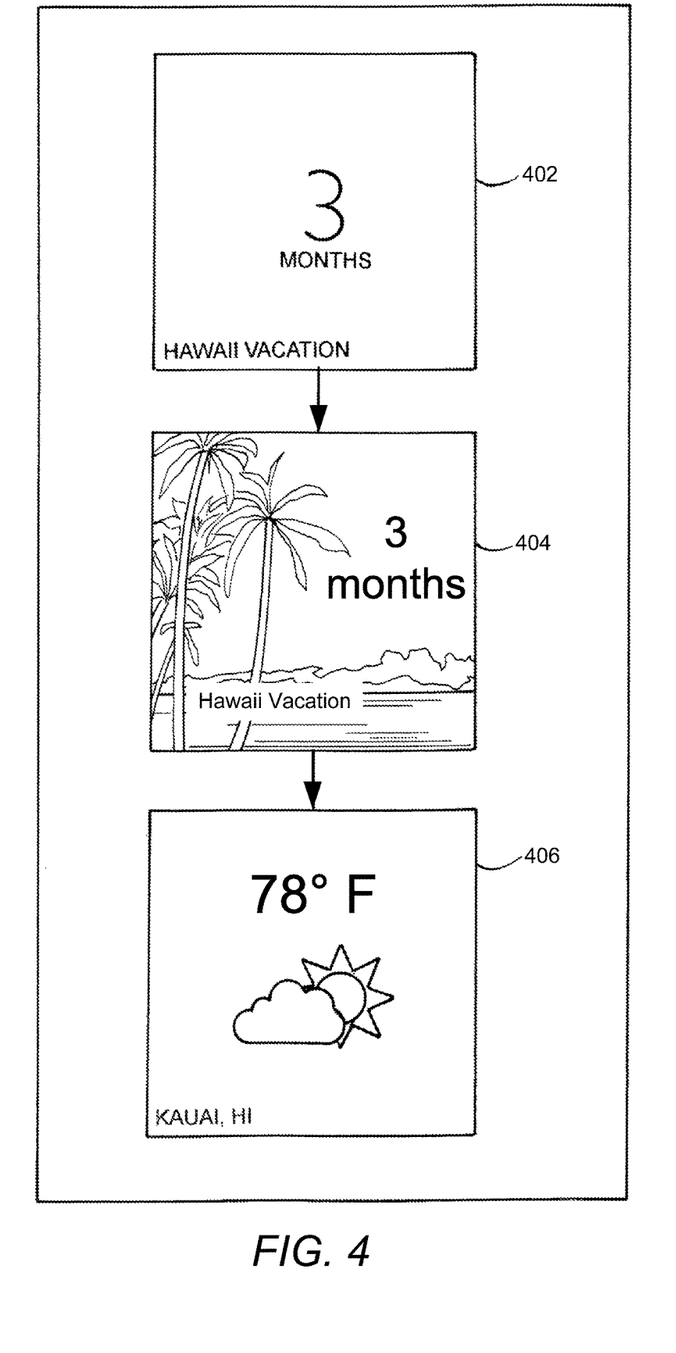
FIG. 4 is an exemplary user interface element illustrating screens conveying a countdown to a calendar event.

Referring next to FIG. 4, an exemplary UI element (e.g., UI element 116) illustrates a plurality of screens conveying a countdown to the calendar event 114 and/or data relating to the calendar event 114. As shown by the arrows between the screens, the screens may be displayed to the user 102 in sequence. For example, at 402, a countdown (e.g., a countdown timer) to the Hawaii vacation is presented in the UI element 116 which at 404 changes automatically to present the countdown along with images from places of interest or places to visit during the calendar event 114. The UI element 116, at 406, may present a weather forecast for the calendar event 114. Therefore, the countdown to the calendar event 114 is supplemented with data relating to the calendar event 114 and presented to the user 102.

Figure 5:
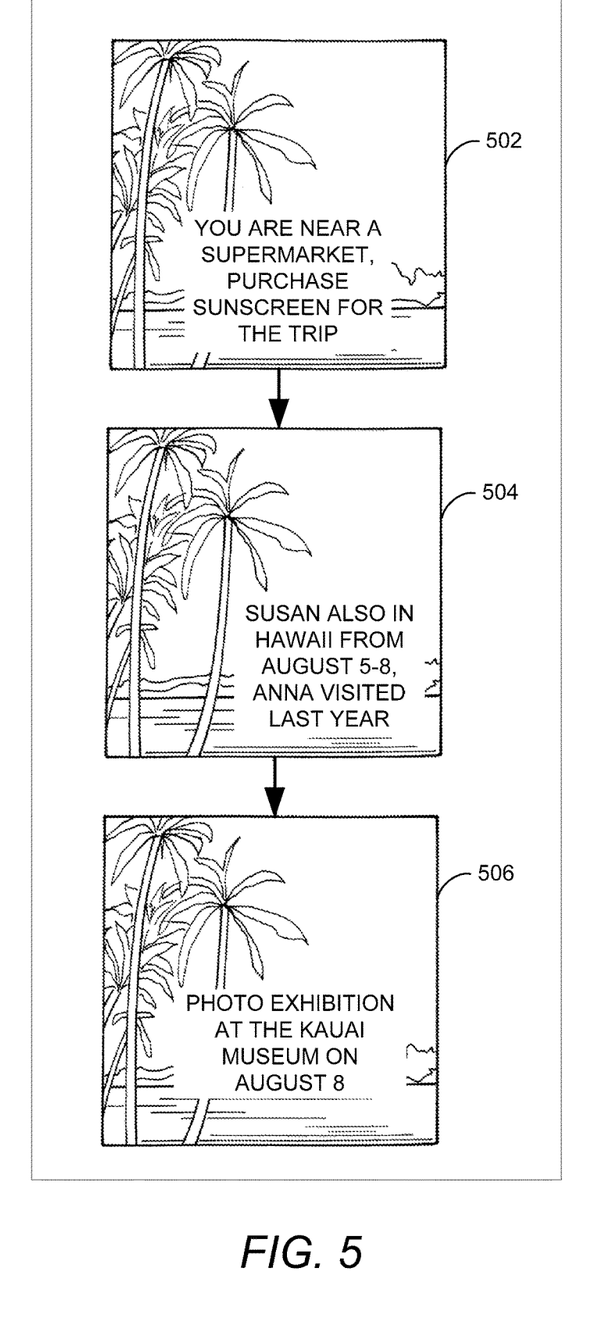
FIG. 5 is an exemplary user interface element illustrating screens containing data relating to a calendar event.
Figure 6:
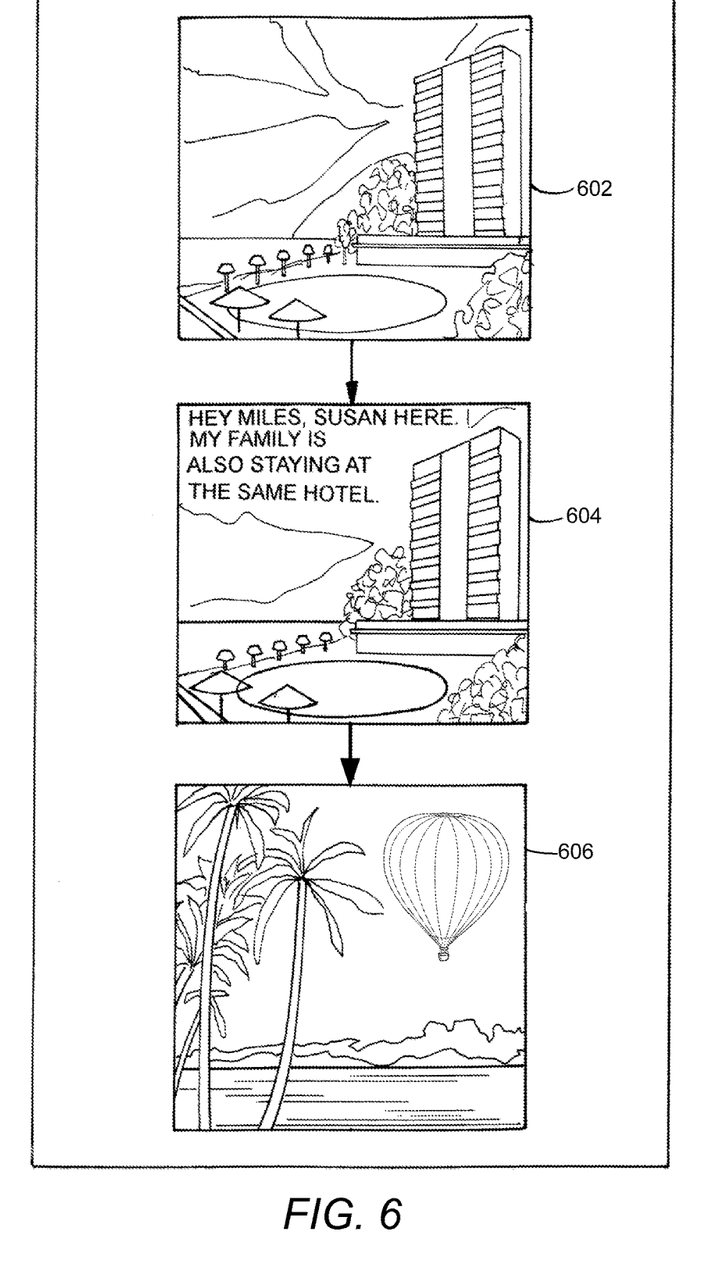
FIG. 6 is another exemplary user interface element illustrating screens containing data relating to a calendar event.

Referring next to FIG. 5 and FIG. 6, exemplary UI elements (e.g., UI elements 116) illustrate examples of screens containing data relating to the calendar event 114. As shown by the arrows between the screens, the screens may be displayed to the user 102 in sequence. At 502, the UI element 116 presents an image relating to the calendar event 114 superimposed with related data obtained via a text-based search based on a location and/or context of the user 102 (e.g., from digital scratchpad applications and/or other applications supporting free-form information gathering and multi-user collaboration). The UI element 116 is updated, at 504, to present obtained data from one or more social networks of the user 102 (e.g., information about contacts who will also be in Hawaii during the calendar event 114, information about contacts who have previously visited Hawaii, etc.). At 506, the UI element 116 is updated to present information about public events going on (or planned) in Hawaii during the calendar event 114.

At 602, the UI element 116 presents an image of the hotel the user 102 has booked to stay in during the Hawaii vacation. The booking information may be obtained, for example, from email communication related to the hotel booking. At 604, the UI element 116 presents a short message service (SMS) message received from Susan, a friend of Miles (e.g., the user 102), regarding staying at the same hotel as Miles. At 606, the UI element 116 presents an image from a festival at the destination the previous year (e.g., from photo albums of contacts, a website, and/or via internet search) because this year's festival is scheduled to occur during the calendar event 114.

Figure 7:
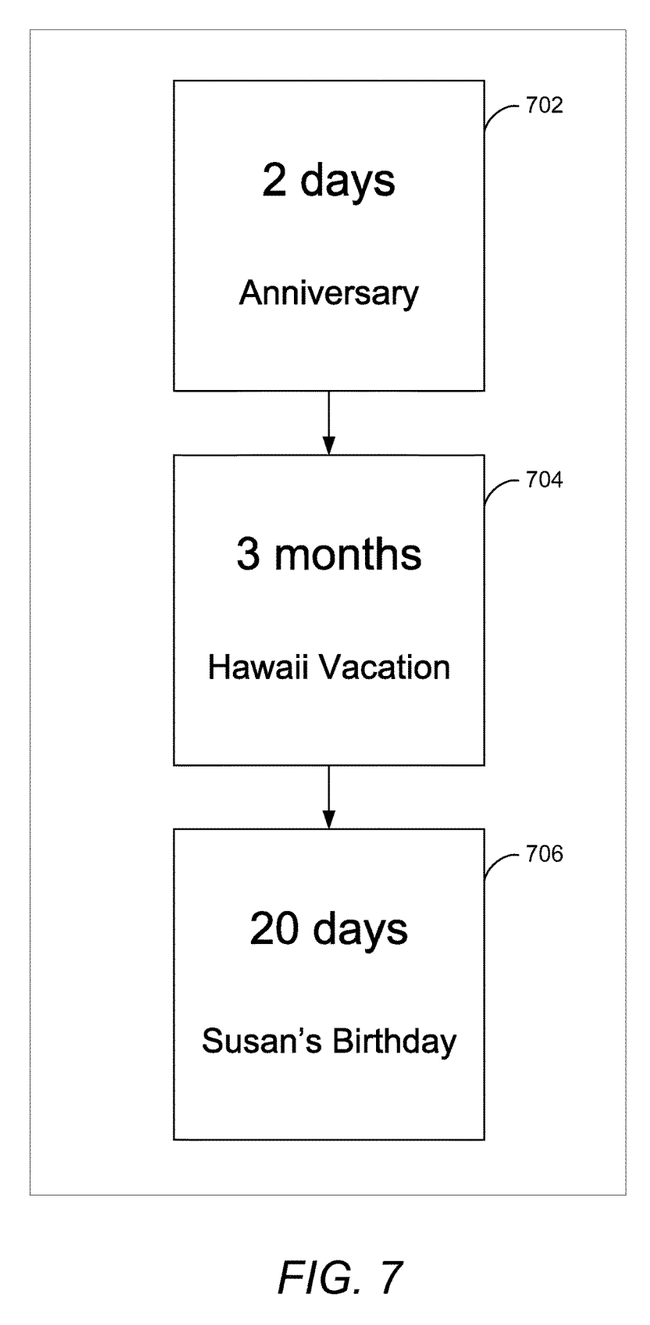
FIG. 7 is an exemplary user interface element illustrating screens presenting countdown information for a plurality of calendar events.

Referring next to FIG. 7, an exemplary UI element (e.g., UI element 116) illustrates screens (e.g., at 702, 704, and 706) presenting countdown information for a plurality of the calendar events 114. The sequence of the data presented in the UI element 116 (e.g., in FIG. 5 through FIG. 7) may be at random, or configurable by the user 102. Any other sequence or combination thereof of presenting data to the user 102 is within scope of the present disclosure.

Additional Examples

Alternatively or in addition to the embodiments described herein, entities other than the application 110A (e.g., the application 110B, an operating system executing on the computing device 104, and/or a web service) may directly update the UI element 116 associated with the application 110A. For example, the application 110A may be unable (or unwilling) to access any of the memory area portions #2 (112B) outside the context of the applications 110A. The other entities then push content to the UI element 116 directly. For example, the UI element 116 associated with the application 110A (having memory area portion #1 as the execution context) may receive and present information about Hawaii trip reservations (e.g., hotel, restaurants, show tickets, etc.) obtained from the memory area portion #2 (which is outside the execution context of the application 110A).

In an exemplary embodiment, the calendar event 114, associated with a first application, is automatically selected (e.g., without user 102 input) based on a predefined threshold quantity of messages available on the computing device 104 (e.g., within a predefined time span). For example, if the user 102 receives a predefined number of messages about a birthday, the calendar event 114 is automatically selected (e.g., pinned to a start screen), and various messages and/or photographs related to the birthday are presented in the UI element 116 associated with the first application. The various messages may be received via an email application, voicemail application, SMS application, and/or the like. In some embodiments, a second application and/or the operating system of the computing device 104 provide the various messages and/or photographs related to the birthday to the UI element 116 associated with the first application 110A. The data on the UI element 116 may be animated.

In some embodiments, people (e.g., attendees) are associated with the calendar event 114. In such embodiments, the UI element 116 is also updated with information associated with those people (e.g., if one of the travelers posts a comment about the trip, or purchases an item from an online retailer, etc.).

The calendar event 114 associated with a first application (e.g., application 110A) executing on the computing device 104 may be updated based on another calendar event associated with a second application (e.g., application 110B) executing on the computing device 104. Further, while described in the context of the calendar events 114 associated with the first application, aspects of the disclosure are operable with any type of event (e.g., not restricted to a calendar event) associated with the first application. In such scenarios, the second application and/or the operating system of the computing device 104 provides data relating to the event from a memory area portion (e.g., memory area portion 112B) outside the execution context of the first application. For example, the user 102 entering a particular location generates a location event for the first application, which receives data relating to the location event from the memory area portion outside the execution context of the first application. As another example, the first application may generate an error event (e.g., a message regarding an illegal operation performed by the user 102). Responsive to the error event, the first application receives data relating to the error event from the memory area portion outside the execution context of the first application.

In some embodiments, the application 110A receives data relating to the calendar event 114 without sending a request for data relating to the calendar event 114 (e.g., without performing a device-wide search or other search).

In an example scenario, the computing device 104 receives a request from the user 102 to remove at least a portion of the obtained data from the UI element 116. In response to the received request, the requested portion of obtained data is removed from the UI element 116. For example, stale data relating to the calendar event 114, data the user 102 would prefer is not displayed, and/or received data that is actually not related to the calendar event 114, may be removed from the UI element 116.

While some embodiments have been described from the perspective of the application 110A receiving data relating to the calendar events 114 from the memory area portion #2 (112B), aspects of the disclosure are operable from the perspective of the application 110B receiving data relating to the calendar events 114 from the memory area portion #1 (112A).

At least a portion of the functionality of the various elements in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While no personally identifiable information is tracked by aspects of the disclosure, embodiments have been described with reference to data monitored and/or collected from the users. In some embodiments, notice may be provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media embody computer readable instructions, data structures, program modules, or other data in a modulated data signal such as a carrier wave or other transport mechanism and include any information delivery media.

Although described in connection with an exemplary computing system environment, embodiments of the disclosure are capable of implementation with numerous other general purpose or special purpose computing system environments, configurations, or devices.

Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Embodiments of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device (e.g., computing device 104) when configured to execute the instructions described herein.

The embodiments illustrated and described herein as well as embodiments not specifically described herein but within the scope of aspects of the invention constitute exemplary means for aggregating and presenting event information in the UI element 116 associated with the application 110A executing on the computing device 104 from one or more of the memory area portions 112B outside the execution context of the application 110A.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for collecting and presenting calendar event information to a user, said system comprising:
   a memory area associated with a mobile computing device, said memory area storing at least one calendar application comprising a calendar event, the calendar application having a first portion of the memory area associated therewith for data storage;
   a display device for presenting, in a first user interface (UI), the at least one calendar application comprising the calendar event; and
   a processor programmed to:
      receive a request to place the calendar event in a second UI;
      based on the received request, receive, from a second portion of the memory area outside an execution context of the calendar application, data relating to the calendar event; and
      present the calendar event and the received data in the second UI, wherein the data relating to the calendar event is presented based on an importance level of the calendar event, and wherein the importance level is determined based on the receiving of the request to place the calendar event in the second UI.

2. The system of claim 1, wherein the processor is further programmed to personalize the second UI based on the received data.

3. The system of claim 1, wherein the data relating to the calendar event is selected based on an importance level of the calendar event.

4. The system of claim 1, wherein the data related to the calendar event is from one or more social networks of the user.

5. The system of claim 1, wherein the at least one calendar application further comprises a plurality of calendar events, and wherein the processor is further programmed to:
   receive a second request to place an additional calendar event from the plurality of calendar events in the second UI;
   based on the second request, receive, from the second portion of the memory area outside an execution context of the calendar application, data relating to the additional calendar event; and
   present the data relating to the additional calendar event in the second UI.

6. A method comprising:
   displaying, in a first user interface (UI), a calendar application comprising a calendar event;
   receiving a request to place the calendar event in a second UI;
   based on the received request, obtaining, from at least one memory area outside an execution context of the calendar application, data relating to the calendar event; and
   displaying the obtained data and the calendar event in the second UI, wherein the data relating to the calendar event is displayed based on an importance level of the calendar event, and wherein the importance level is determined based on the receiving of the request to place the calendar event in the second UI.

7. The method of claim 6, wherein receiving the request to place the calendar event in the second UI comprises receiving the request from a user.

8. The method of claim 6, further comprising:
   generating uniform resource identifiers (URIs) for the obtained data;
   storing the generated URIs within the execution context of the calendar application; and
   sharing the stored, generated URIs with at least one attendee associated with the calendar event.

9. The method of claim 6, wherein obtaining the data comprises performing, outside the execution context of the application, a text-based search for the data.

10. The method of claim 6, wherein the calendar event has a location associated therewith, and wherein obtaining the data comprises performing a search for the data using the location as a search term.

11. The method of claim 6, wherein the calendar event has a start time associated therewith, and wherein obtaining the data comprises performing a search for the data based on the start time.

12. The method of claim 6, wherein obtaining the data from the at least one memory area comprises obtaining the data from a memory area on a computing device and from a memory area off the computing device, wherein the obtained data comprises one or more of the following: text data, image data, video data, and audio data.

13. The method of claim 6, further comprising receiving additional data from a user, and storing the additional data within the execution context of the calendar application.

14. The method of claim 6, further comprising:
identifying at least one attendee associated with the calendar event;
obtaining data associated with the attendee; and
updating the second UI with the obtained data associated with the attendee.

15. The method of claim 6, further comprising:
storing the obtained data in a data structure associated with the second UI;
transmitting the data structure to a computing device, wherein the computing device updates the data structure with additional data relating to the calendar event;
receiving the updated data structure from the computing device; and
updating the second UI with the received, updated data structure.

16. One or more computer storage devices embodying computer-executable components, said components comprising:
a configuration component comprising instructions, that upon execution causes at least one processor to receive a calendar event associated with an application, the calendar event having a start date associated therewith;
an aggregation component comprising instructions, that upon execution causes the at least one processor to obtain, based on the received calendar event and from a content source outside an execution context of the application, data relating to the received calendar event; and
a user interface (UI) component comprising instructions, that upon execution causes the at least one processor to:
present, in a first user interface (UI), a calendar application comprising a calendar event;
receive a request to place the calendar event in a second UI;
based on the received request, present the calendar event in the second UI and present the data obtained by the aggregation component in the second UI for display to a user, wherein the data relating to the calendar event is presented based on an importance level of the calendar event, and wherein the importance level is determined based on the receiving of the request to place the calendar event in the second UI, and
wherein the aggregation component and the user interface component execute intermittently before and after the start date.

17. The computer storage devices of claim 16, wherein the aggregation component and the UI component comprise instructions, that upon execution further cause the at least one processor to display, after occurrence of the calendar event, photographs taken during the calendar event.

18. The computer storage devices of claim 16, wherein the aggregation component and the UI component comprise instructions, that upon execution further cause the at least one processor to display social network messages relating to the calendar event.

19. The computer storage devices of claim 16, wherein the UI component further causes the at least one processor to:
receive a selection of the data obtained by the aggregation component; and
in response to the received data selection, provide aggregation metadata describing aggregation of the received data selection, wherein the aggregation metadata comprises one or more of the following: a time of aggregation, a network address associated with the content source, and an attribution of the selected data.

20. The computer storage devices of claim 16, wherein obtaining the data comprises performing, outside the execution context of the calendar application, a text-based search for the data.

* * * * *